(12) United States Patent
Yonge, III et al.

(10) Patent No.: US 8,467,369 B2
(45) Date of Patent: Jun. 18, 2013

(54) DISTRIBUTED SCHEDULING

(75) Inventors: Lawrence W. Yonge, III, Ocala, FL (US); Srinivas Katar, Gainesville, FL (US); Shmuel Goldfisher, Petah-Tikva (IL); Erez Geva, Gan Yavne (IL)

(73) Assignee: Qualcomm Atheros, Inc., San Jose, CA (US)

( * ) Notice: Subject to any disclaimer, the term of this patent is extended or adjusted under 35 U.S.C. 154(b) by 972 days.

(21) Appl. No.: 12/133,270

(22) Filed: Jun. 4, 2008

(65) Prior Publication Data

US 2009/0116461 A1 May 7, 2009

Related U.S. Application Data

(60) Provisional application No. 60/941,949, filed on Jun. 4, 2007.

(51) Int. Cl.
*H04J 3/00* (2006.01)
(52) U.S. Cl.
USPC ............ 370/345; 370/410; 370/432; 370/458
(58) Field of Classification Search
USPC ................. 370/254, 345, 348, 352, 335, 328, 370/278, 236, 401, 458, 432, 445; 455/67.11, 455/432
See application file for complete search history.

(56) References Cited

U.S. PATENT DOCUMENTS

| | | | |
|---|---|---|---|
| 4,578,530 A | 3/1986 | Zeidler | |
| 4,689,786 A | 8/1987 | Sidhu et al. | |
| 4,807,248 A | 2/1989 | Pyatt et al. | |
| 5,328,530 A * | 7/1994 | Semiatin et al. | 148/559 |
| 5,359,625 A | 10/1994 | Vander Mey et al. | |
| 5,570,355 A * | 10/1996 | Dail et al. | 370/352 |
| 5,682,428 A | 10/1997 | Johnson | |
| 5,732,076 A | 3/1998 | Ketseoglou et al. | |
| 6,074,086 A | 6/2000 | Yonge, III | |
| 6,111,919 A | 8/2000 | Yonge, III | |

(Continued)

FOREIGN PATENT DOCUMENTS

| EP | 1179919 | 2/2002 |
|---|---|---|
| EP | 1748574 | 1/2007 |

(Continued)

OTHER PUBLICATIONS

Notification of Reasons for Rejection, Japanese Patent Office, issued in Japanese Patent Application No. 2006-205200, dated Jan. 18, 2011, 3 pages.

(Continued)

*Primary Examiner* — Andrew Lai
*Assistant Examiner* — Sumitra Ganguly
(74) *Attorney, Agent, or Firm* — DeLizio Gilliam, PLLC

(57) ABSTRACT

In a network, some data are transmitted between stations during time slots in contention free periods. Selecting the time slots includes collecting timing information at some stations in the network. The timing information indicates the times of existing time slots used by stations whose transmissions can be reliably received by the station collecting the timing information. The timing information is distributed to other stations in the network. A new time slot for transmission between a first and a second station is selected based at least on timing information indicating the times of existing time slots used by stations whose transmissions can be reliably received by at least one of the first and second station.

55 Claims, 8 Drawing Sheets

U.S. PATENT DOCUMENTS

| | | |
|---|---|---|
| 6,141,355 A | 10/2000 | Palmer et al. |
| 6,167,137 A | 12/2000 | Marino et al. |
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 * | 2/2001 | Oohara .................. 709/238 |
| 6,201,794 B1 | 3/2001 | Stewart et al. |
| 6,243,761 B1 | 6/2001 | Mogul et al. |
| 6,269,132 B1 | 7/2001 | Yonge, III |
| 6,269,163 B1 | 7/2001 | Rivest et al. |
| 6,272,135 B1 | 8/2001 | Nakatsugawa |
| 6,278,685 B1 | 8/2001 | Yonge, III |
| 6,307,940 B1 | 10/2001 | Yamamoto et al. |
| 6,310,892 B1 | 10/2001 | Olkin |
| 6,388,995 B1 | 5/2002 | Gai et al. |
| 6,519,231 B1 | 2/2003 | Ding et al. |
| 6,574,195 B2 | 6/2003 | Roberts |
| 6,591,364 B1 | 7/2003 | Patel |
| 6,606,303 B1 | 8/2003 | Hassel et al. |
| 6,631,136 B1 | 10/2003 | Chowdhury et al. |
| 6,711,163 B1 | 3/2004 | Reid et al. |
| 6,775,656 B1 | 8/2004 | Gettwart et al. |
| 6,804,252 B1 * | 10/2004 | Johnson .................. 370/458 |
| 6,904,462 B1 | 6/2005 | Sinha |
| 6,910,136 B1 | 6/2005 | Wasserman et al. |
| 7,039,021 B1 | 5/2006 | Kokudo |
| 7,085,284 B1 | 8/2006 | Negus |
| 7,181,620 B1 | 2/2007 | Hur |
| 7,234,058 B1 | 6/2007 | Baugher et al. |
| 7,346,021 B2 | 3/2008 | Yoshizawa et al. |
| 7,350,076 B1 | 3/2008 | Young et al. |
| 7,352,770 B1 | 4/2008 | Yonge et al. |
| 7,369,579 B2 | 5/2008 | Logvinov et al. |
| 7,409,543 B1 | 8/2008 | Bjorn |
| 7,496,039 B2 | 2/2009 | Yamada et al. |
| 7,506,042 B2 | 3/2009 | Ayyagari |
| 7,558,294 B2 | 7/2009 | Yonge et al. |
| 7,609,681 B2 | 10/2009 | Kurobe et al. |
| 7,756,039 B2 | 7/2010 | Yonge, III |
| 7,797,751 B1 | 9/2010 | Hughes et al. |
| 7,826,618 B2 | 11/2010 | Klingler et al. |
| 7,894,487 B2 | 2/2011 | Yonge, III et al. |
| 7,949,356 B2 | 5/2011 | Yonge, III |
| 8,112,358 B2 | 2/2012 | Yonge, III |
| 8,170,051 B2 | 5/2012 | Yonge, III et al. |
| 2001/0000709 A1 | 5/2001 | Takahashi et al. |
| 2002/0015496 A1 | 2/2002 | Weaver, III et al. |
| 2002/0025810 A1 * | 2/2002 | Takayama et al. ............ 455/432 |
| 2002/0029260 A1 | 3/2002 | Dobbins et al. |
| 2002/0060986 A1 | 5/2002 | Fukushima et al. |
| 2002/0097679 A1 | 7/2002 | Berenbaum |
| 2002/0107023 A1 | 8/2002 | Chari et al. |
| 2002/0114303 A1 | 8/2002 | Crosbie et al. |
| 2002/0122411 A1 | 9/2002 | Zimmerman et al. |
| 2002/0124177 A1 | 9/2002 | Harper et al. |
| 2002/0137462 A1 | 9/2002 | Rankin |
| 2002/0141417 A1 | 10/2002 | Umayabashi |
| 2003/0012166 A1 | 1/2003 | Benveniste |
| 2003/0018812 A1 | 1/2003 | Lakshminarayana et al. |
| 2003/0048183 A1 | 3/2003 | Vollmer et al. |
| 2003/0067892 A1 | 4/2003 | Beyer et al. |
| 2003/0086437 A1 | 5/2003 | Benveniste |
| 2003/0095551 A1 | 5/2003 | Gotoh et al. |
| 2003/0137993 A1 | 7/2003 | Odman |
| 2003/0193959 A1 * | 10/2003 | Lui et al. .................. 370/401 |
| 2003/0224784 A1 | 12/2003 | Hunt et al. |
| 2003/0228846 A1 * | 12/2003 | Berliner et al. ............ 455/67.11 |
| 2003/0229783 A1 | 12/2003 | Hardt |
| 2004/0047319 A1 | 3/2004 | Elg |
| 2004/0070912 A1 | 4/2004 | Kopp |
| 2004/0081089 A1 | 4/2004 | Ayyagari et al. |
| 2004/0090982 A1 * | 5/2004 | Xu .................. 370/447 |
| 2004/0165532 A1 | 8/2004 | Poor et al. |
| 2004/0190542 A1 | 9/2004 | Ono et al. |
| 2004/0210630 A1 | 10/2004 | Simonnet et al. |
| 2004/0218577 A1 | 11/2004 | Nguyen et al. |
| 2004/0234073 A1 | 11/2004 | Sato et al. |
| 2004/0264428 A1 | 12/2004 | Choi et al. |
| 2005/0001694 A1 | 1/2005 | Berkman |
| 2005/0021539 A1 | 1/2005 | Short et al. |
| 2005/0025176 A1 | 2/2005 | Ko et al. |
| 2005/0068227 A1 | 3/2005 | Caspi et al. |
| 2005/0071631 A1 | 3/2005 | Langer |
| 2005/0089005 A1 | 4/2005 | Sakoda et al. |
| 2005/0114489 A1 | 5/2005 | Yonge, III |
| 2005/0117515 A1 | 6/2005 | Miyake |
| 2005/0117750 A1 | 6/2005 | Rekimoto |
| 2005/0135291 A1 | 6/2005 | Ketchum et al. |
| 2005/0147075 A1 | 7/2005 | Terry |
| 2005/0169222 A1 | 8/2005 | Ayyagari et al. |
| 2005/0190785 A1 | 9/2005 | Yonge, III et al. |
| 2005/0210157 A1 | 9/2005 | Sakoda |
| 2005/0243765 A1 * | 11/2005 | Schrader et al. ............. 370/328 |
| 2005/0249186 A1 | 11/2005 | Kelsey et al. |
| 2006/0002406 A1 | 1/2006 | Ishihara et al. |
| 2006/0039371 A1 | 2/2006 | Castro et al. |
| 2006/0072517 A1 * | 4/2006 | Barrow et al. ................ 370/335 |
| 2006/0077997 A1 | 4/2006 | Yamaguchi et al. |
| 2006/0104301 A1 | 5/2006 | Beyer et al. |
| 2006/0159260 A1 | 7/2006 | Pereira et al. |
| 2006/0168647 A1 | 7/2006 | Chiloyan |
| 2006/0224813 A1 | 10/2006 | Rooholamini et al. |
| 2006/0251021 A1 | 11/2006 | Nakano et al. |
| 2006/0256741 A1 * | 11/2006 | Nozaki ......................... 370/278 |
| 2006/0268746 A1 * | 11/2006 | Wijting et al. ............... 370/254 |
| 2007/0025244 A1 | 2/2007 | Ayyagari et al. |
| 2007/0025384 A1 * | 2/2007 | Ayyagari et al. ............ 370/445 |
| 2007/0025391 A1 | 2/2007 | Yonge, III et al. |
| 2007/0026794 A1 | 2/2007 | Ayyagari et al. |
| 2007/0030811 A1 | 2/2007 | Frei et al. |
| 2007/0053520 A1 | 3/2007 | Eckleder |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0097867 A1 * | 5/2007 | Kneckt et al. ................ 370/236 |
| 2007/0118730 A1 | 5/2007 | Platt |
| 2007/0133388 A1 * | 6/2007 | Lee et al. ..................... 370/206 |
| 2007/0133449 A1 * | 6/2007 | Schacht et al. ................ 370/312 |
| 2007/0140185 A1 | 6/2007 | Garg et al. |
| 2007/0147322 A1 | 6/2007 | Agrawal et al. |
| 2007/0220570 A1 | 9/2007 | Dawson et al. |
| 2007/0271398 A1 | 11/2007 | Manchester et al. |
| 2007/0286074 A1 | 12/2007 | Xu |
| 2008/0002599 A1 | 1/2008 | Yau et al. |
| 2008/0151820 A1 | 6/2008 | Solis et al. |
| 2008/0181219 A1 * | 7/2008 | Chen et al. .................... 370/389 |
| 2008/0186230 A1 | 8/2008 | Wengler et al. |
| 2008/0212591 A1 | 9/2008 | Wu et al. |
| 2008/0222447 A1 | 9/2008 | Ram et al. |
| 2008/0279126 A1 | 11/2008 | Katar et al. |
| 2008/0298252 A1 | 12/2008 | Yonge, III |
| 2008/0298589 A1 | 12/2008 | Katar et al. |
| 2008/0298590 A1 | 12/2008 | Katar et al. |
| 2008/0298594 A1 | 12/2008 | Yonge, III |
| 2008/0301446 A1 | 12/2008 | Yonge, III |
| 2008/0310414 A1 | 12/2008 | Yonge, III |
| 2009/0010276 A1 | 1/2009 | Yonge, III |
| 2009/0011782 A1 | 1/2009 | Yonge et al. |
| 2009/0034552 A1 | 2/2009 | Yonge et al. |
| 2009/0040930 A1 | 2/2009 | Yonge, III |
| 2009/0067389 A1 | 3/2009 | Lee et al. |
| 2009/0074007 A1 | 3/2009 | Yonge, III |
| 2009/0106551 A1 | 4/2009 | Boren et al. |
| 2009/0154487 A1 | 6/2009 | Ryan et al. |
| 2009/0207865 A1 | 8/2009 | Yonge et al. |
| 2009/0311963 A1 | 12/2009 | Haverty |
| 2010/0014444 A1 | 1/2010 | Ghanadan et al. |
| 2010/0091760 A1 | 4/2010 | Yoon |
| 2010/0100724 A1 | 4/2010 | Kaliski, Jr. |
| 2012/0072715 A1 | 3/2012 | Yonge, III |

FOREIGN PATENT DOCUMENTS

| | | |
|---|---|---|
| EP | 1748597 | 1/2007 |
| JP | 03-107317 | 5/1991 |
| JP | 2002-135177 | 5/2002 |
| JP | 2005-073240 | 3/2005 |
| WO | WO 96/34329 | 10/1996 |

| | | |
|---|---|---|
| WO | WO 98/57439 | 12/1998 |
| WO | WO 02/103943 | 12/2002 |
| WO | WO 03/100996 | 12/2003 |
| WO | WO 2004/038980 | 5/2004 |

OTHER PUBLICATIONS

Afkhamie et al., "An Overview of the Upcoming HomePlug AV Standard," May 2005, IEEE 0-7803-8844-05/05, pp. 400-404.

European Search Report, European Patent Office, European Patent Application No. 06253916.8-1246, Oct. 31, 2006, 8 pages.

HomePlug Powerline Alliance Inc., "HomePlug AV White Paper," Doc. Ver. No. HPAVWP-050818, Aug. 2005, pp. 1-11.

International Search Report & Written Opinion in PCT application No. PCT/US2008/065831, dated Feb. 20, 2009, 22 pages.

Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 Powerline Communication LANs-Protocol Description and Performance Results version 5.4," 2000, International Journal of Communication Systems, 2000 00:1-6, pp. 1-25.

Notification of First Office Action, The State Intellectual Property Office of the People's Republic of China, issued in Chinese Application No. 200610107587.1, dated Oct. 11, 2010, 6 pages.

European Search Report—EP09178487, Search Authority, Munich Patent Office, Jan. 21, 2010.

Faure, Jean-Philippe et al., Call for Submissions. Draft Standard for Broadband over Power Line Networks: Medium Access Control and Physical Layer Specifications. Feb. 14, 2007, 4 pages.

Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.

International Search Report and Written Opinion—PCT/US2008/065811, International Searching Authority, European Patent Office, Nov. 25, 2008.

Loh et al, Quality of Support and priority Management in HomePNA 2.0 Link Layer, IEEE, 6 pages, 2003.

Opera Specification-Part 1: Technology, Open PLC European Research Alliance, 198 pages, 1006.

Co-pending U.S. Appl. No. 13/113,474, filed May 23, 2011, 32 pages.

"U.S. Appl. No. 11/970,271 Final Office Action", Jul. 19, 2011, 21 pages.

"U.S. Appl. No. 11/970,271 Office Action", Mar. 9, 2012, 19 pages.

"U.S. Appl. No. 11/970,271 Office Action", Oct. 7, 2011, 20 pages.

"U.S. Appl. No. 11/970,271 Office Action", Dec. 7, 2010, 21 pages.

"U.S. Appl. No. 11/970,297 Final Office Action", Apr. 16, 2012, 32 pages.

"U.S. Appl. No. 11/970,297 Office Action", Mar. 30, 2011, 30 pages.

"U.S. Appl. No. 11/970,297 Office Action", Sep. 29, 2011, 31 pages.

"U.S. Appl. No. 11/970,323 Office Action", Dec. 7, 2010, 12 pages.

"U.S. Appl. No. 11/970,339 Final Office Action", Jul. 7, 2011, 14 pages.

"U.S. Appl. No. 11/970,339 Office Action", Jan. 19, 2011, 22 pages.

"U.S. Appl. No. 11/970,339 Office Action", Jun. 18, 2012, 26 pages.

"U.S. Appl. No. 11/971,446 Office Action", Feb. 15, 2011, 20 pages.

"U.S. Appl. No. 11/971,446 Final Office Action", Jul. 1, 2011, 17 pages.

"U.S. Appl. No. 12/108,334 Final Office Action", Jun. 14, 2011, 28 pages.

"U.S. Appl. No. 12/108,334 Office Action", Feb. 16, 2011, 26 pages.

"U.S. Appl. No. 12/108,334 Office Action", Aug. 3, 2010, 20 pages.

"U.S. Appl. No. 12/108,334 Office Action", Aug. 3, 2012, 18 pages.

"U.S. Appl. No. 12/133,301 Final Office Action", Mar. 22, 2011, 39 pages.

"U.S. Appl. No. 12/133,301 Office Action", Sep. 22, 2010, 42 pages.

"U.S. Appl. No. 12/133,301 Office Action", Mar. 1, 2012, 38 pages.

"U.S. Appl. No. 12/133,312 Final Office Action", Feb. 16, 2011, 24 pages.

"U.S. Appl. No. 12/133,312 Office Action", Jun. 8, 2011, 24 pages.

"U.S. Appl. No. 12/133,312 Office Action", Jul. 28, 2010, 29 pages.

"U.S. Appl. No. 12/133,315 Final Office Action", Jun. 9, 2011, 38 pages.

"U.S. Appl. No. 12/133,315 Final Office Action", Jul. 20, 2010, 30 pages.

"U.S. Appl. No. 12/133,315 Office Action", Aug. 9, 2012, 37 pages.

"U.S. Appl. No. 12/133,315 Office Action", Dec. 24, 2009, 28 pages.

"U.S. Appl. No. 12/133,315 Office Action", Dec. 28, 2010, 36 pages.

"U.S. Appl. No. 12/133,325 Final Office Action", Dec. 9, 2010, 33 pages.

"U.S. Appl. No. 12/133,325 Office Action", May 27, 2010, 31 pages.

"U.S. Appl. No. 12/133,301 Final Office Action", Sep. 26, 2012, 54 pages.

Muir A., et al., "An Efficient Packet Sensing Mac Protocol for Wireless Networks", Computer Engineering Department School of Engineering, University of California, Aug. 1998, pp. 20.

Notification of First Office Action, the State Intellectual Property Office of the People's Republic of China, issued in Chinese Application No. 200880100486.9, Nov. 21, 2012, 17 pages.

U.S. Appl. No. 13/303,913 Office Action, Dec. 26, 2012, 37 pages.

U.S. Appl. No. 11/970,339 Final Office Action, Dec. 11, 2012, 25 pages.

* cited by examiner

DISTRIBUTED SCHEDULING

CROSS-REFERENCE TO RELATED APPLICATIONS

This application claims priority to U.S. Provisional Application Ser. No. 60/941,949, entitled "MANAGING COMMUNICATIONS OVER A SHARED MEDIUM," filed on Jun. 4, 2007, which is incorporated herein by reference.

TECHNICAL FIELD

The invention relates to distributed scheduling.

BACKGROUND

A network of communication stations can share a communication medium (e.g., wires connecting multiple stations or spectrum for transmitting radio signals among stations) using any of a variety of access techniques. Some access techniques (e.g., time division multiplexing (TDM) techniques) allocate predetermined time intervals in which certain stations are granted use of the medium. A particular station will transmit within a time slot assigned to that station. A schedule indicating which time slots have been allocated to particular stations can be determined by a designated "central coordinator" station taking into account requests made from various stations. The schedule can be distributed by the central coordinator station and relayed, if necessary, to all the stations in the network.

SUMMARY

In one aspect, in general, in a network in which some data are transmitted between stations during time slots in contention free periods, a method for selecting the time slots includes collecting timing information at some stations in the network. The timing information indicates the times of existing time slots used by stations whose transmissions can be reliably received by the station collecting the timing information. The method includes distributing the timing information to other stations in the network, and selecting a new time slot for transmission between a first and a second station based at least on timing information indicating the times of existing time slots used by stations whose transmissions can be reliably received by at least one of the first and second station.

Aspects can include one or more of the following features.

The method further comprises collecting additional information about transmissions made during the existing time slots by the stations whose transmissions can be reliably received, the additional information being useful in selecting the new time slot and including at least one of information on transmit power level, information on received signal strength, and information on priority.

Selecting the new time slot is also based at least on information indicating the times of existing time slots during which stations heard by the first station are receiving.

The new time slot excludes times when stations heard by the first station are scheduled to receive other transmissions.

The new time slot is selected at the first station for transmission from the first station to the second station.

Selecting the new time slot is also based at least on information indicating the times of existing time slots during which stations scheduled to transmit can be heard by the second station.

The new time slot excludes times when stations heard by the second station are scheduled to transmit other transmissions.

The new time slot is selected at the first station for transmission from the first station to the second station.

Selecting the new time slot is also based at least on information indicating the times of existing time slots during which stations heard by first station are transmitting.

The new time slot excludes times when stations heard by the first station are scheduled to transmit other transmissions.

The new time slot is selected at the first station for transmission from the second station to the first station.

Selecting the new time slot is also based at least on information indicating the times of existing time slots during which stations scheduled to receive can be heard by the second station.

The new time slot excludes times when stations heard by the second station are scheduled to receive other transmissions.

The new time slot is selected at the first station for transmission from the second station to the first station.

The new time slot is selected to overlap in time at least one existing time slot.

The new time slot is selected to overlap in time at least one existing time slot, and wherein processing of the additional information establishes that overlapping of the new time slot with the existing time slot can be accomplished because of the relatively low transmit power used by the station transmitting during the existing time slot.

The new time slot is selected to overlap in time with at least one existing time slot, and wherein processing of the additional information establishes that overlapping of the new time slot with the existing time slot can be accomplished because the transmit power to be used for transmissions during the new time slot will not interfere with existing transmissions in the existing time slot.

The new time slot is selected to overlap in time with at least one existing time slot, and wherein processing of the additional information establishes that overlapping of the new time slot with the existing time slot can be accomplished because of the low signal strength of transmissions in the existing time slot.

The timing information on existing time slots comprises the source and/or destination address of transmissions in the existing period.

The network comprises a plurality of neighboring home networks, and the existing time slot is used in one neighboring home network and the new time slot is selected for use in a different neighboring home network.

The stations in the network are configured as peers.

The stations in the network are configured to use a point to multipoint network protocol.

At least one of the stations is a head end station and the selection of time slots is initiated after the head end station has agreed to establish a network connection with another station in the network.

The first station is the head end station, and the second station is a station that can be heard by the head end station.

Selecting a time slot for transmission between the second station and a third station is performed after the time slot has been chosen for transmission from the first to the second station.

Beacons contain the timing information on existing time slots.

Beacons contain the timing and additional information on existing time slots.

The timing information on existing time slots is transmitted to other stations in message packets.

The timing and additional information on existing time slots is transmitted to other stations in message packets.

The information on priority comprises information on the priority of transmissions during the existing time slot.

The new time slot is selected to overlap at least one existing time slot in which the priority of transmissions is lower than the priority of transmissions to occur during the new time slot.

The network is a point to multi-point network and priority is based on the number of hops that the traffic belonging to the existing and new time slots is from a head end.

The network is a point to multi-point network and priority is based on the number of hops that the traffic belonging to the existing and new time slots is from a head end.

The timing information provided by a station includes at least some time periods that the station is using for contention periods.

At least a portion of the new time slot selected comprises time intervals currently used for CSMA communication by at least the first and second stations.

The first station is the head end of a point to multi-point network, and the head end selects the new time slots for multiple hops downstream from the head end, including a hop from the head end to the second station, and from the second station to a third station.

Each station in the network can reliably receive transmissions from all other stations in the network.

At least some stations in the network cannot reliably receive transmissions from all other stations in the network.

Transmissions in the existing time slot cannot be reliably received by only one of the first and second stations.

A first time slot is allocated for transmission from the first station to the second station and a second time slot is allocated for transmission from the second station to the first station, and the second time slot is used to send acknowledgements of previous transmissions from the first station during the first time slot.

In another aspect, in general, a method for communicating among stations in a network includes providing repeated beacon transmissions from a first station for coordinating transmissions among a plurality of the stations. The method includes retransmitting from at least one second station at least some information received at the second station, including at least a portion of a received beacon transmission. The method includes transmitting from the first station information that determines allocated time for the first station to transmit or receive transmissions. The method includes transmitting from a third station information that determines allocated time for the third station to transmit or receive transmissions, wherein the third station reliably receives transmissions from the second station and does not reliably receive transmissions from the first station.

Aspects can include one or more of the following features.

The method further comprises transmitting from the second station information that is used to determine allocated time for the second station to transmit or receive transmissions.

The information used to determine allocated time for the first station to transmit or receive transmissions is also used to determine allocated time for the second station to transmit or receive transmissions.

Determining allocated time for a station to transmit or receive transmissions includes determining the allocated time relative to a periodic time reference indicated in a beacon transmission.

The second station reliably receives transmissions from the first station.

The first station is in communication with a fourth station over a route that includes the second station and the third station.

The method further comprises resolving conflicts between time allocated by different stations based on proximity of the different stations to the first station.

The proximity of a given station to the first station comprises a number of hops along a route from the first station to the given station.

The proximity of a given station to the first station comprises a signal strength of a transmission from the first station received by the given station.

The proximity of a given station to the first station comprises a data rate of a transmission from the first station received by the given station.

In another aspect, in general, a method for communicating among stations in a network includes, from each of multiple stations in the network, transmitting information characterizing transmissions received by the station from other stations. The method includes, at each of multiple stations in the network, determining allocated time for the station to transmit or receive transmissions based on at least some of the information characterizing transmissions, transmitting information indicating the allocated time. The method includes, at each of multiple stations in the network, determining allocated time for the station to transmit or receive transmissions based on at least some of the information characterizing transmissions and based on at least some of the information indicating the allocated time from other stations.

Aspects can include one or more of the following features.

The information characterizing transmissions received by the station from other stations includes at least one of: times at which the transmissions were received, and signal strengths of the transmissions.

The method further comprises forwarding the information characterizing transmissions.

The method further comprises, at each of multiple stations in the network, determining the allocated time based on at least some of the forwarded information.

Each station in the network is separated from a first station by a number of hops over which transmissions are repeated.

The first station determines allocated time for a first set of stations to transmit or receive transmissions over multiple hops, and remaining stations collectively determine allocated times to transmit or receive transmissions over individual hops.

In another aspect, in general, a method for communicating among stations in a network includes, at each of multiple stations in the network, collecting timing information about when transmissions from different stations are received or transmitted. The method includes distributing the timing information to multiple stations in the network. The method includes using the distributed timing information at different stations to determine respective timing schedules for communicating with stations from which the station can reliably receive transmissions.

Aspects can include one or more of the following features.

The method further comprises collecting information about activity at other stations that is determined based on the received transmissions.

The information about activity at other stations comprises information about a flow of data associated with a connection between stations at the ends of a route having multiple hops over links between intermediate stations.

The method further comprises selecting time slots in the respective timing schedules for communicating between stations at the ends of a route having multiple hops over links between intermediate stations.

There are at least as many time slots in the timing schedules as there are links on the route.

Transmissions over sequential links of the route are scheduled in respective sequential time slots.

The timing schedules comprise time slots within at least one contention free period of a repeating schedule.

In another aspect, in general, a system for communicating among multiple stations includes a first station configured to provide repeated beacon transmissions for coordinating transmissions among a plurality of the stations, and to transmit information that determines allocated time for the first station to transmit or receive transmissions. The system includes at least one second station configured to retransmit at least some information received at the second station, including at least a portion of a received beacon transmission. The system includes at least one third station configured to transmit information that determines allocated time for the third station to transmit or receive transmissions, wherein the third station reliably receives transmissions from the second station and does not reliably receive transmissions from the first station.

Among the many advantages of the invention (some of which may be achieved only in some of its various aspects and implementations) are the following.

By collecting timing information indicating the times of existing time slots used by stations and distributing the timing information, contention free time slots can be selected for transmission between stations in distributed manner efficiently. Optionally, a head end (HE) station can centrally determine time slots for some stations that are near the HE, and the remaining stations can collectively determine remaining times slots in a distributed (e.g., hierarchical) manner. Traffic near the HE can be optimized by the HE to reduce potential congestion near the HE. The approach enables a given time slot to be reused by stations that are separated, such that they cannot hear (or interfere with) each other. Priority information can be used to determine if a station can preempt an existing previously allocated time slot. This enables a link closer to the HE station to be allocated in a manner that increases efficiency by preempting lower priority allocations. By scheduling time slots such that successive transmissions over links of a route are scheduled in respective sequential time slots, the latency of the corresponding connection is reduced.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
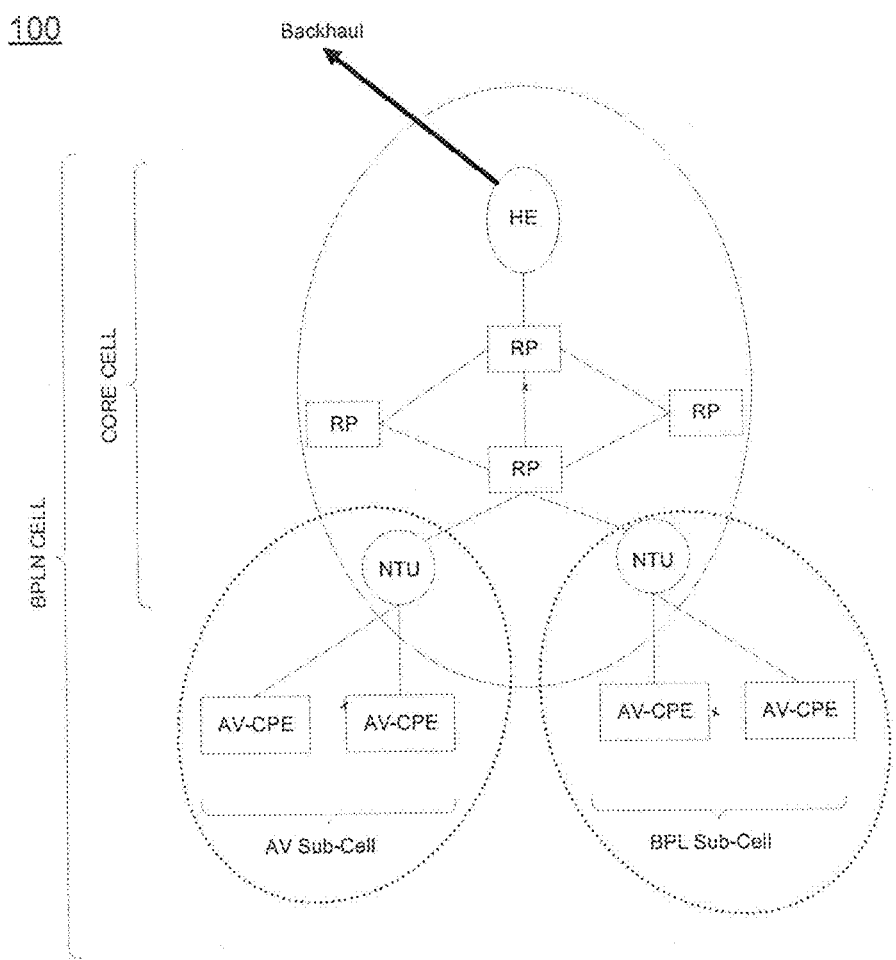
FIG. 1 is a schematic diagram of a communication network.

FIG. 1 shows an exemplary network configuration for an access network 100 such as a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more Cells. A cell is a group of broadband power line (BPL) stations in a BPLN that have similar characteristics such as association management, security, Quality of Service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

A Core-Cell includes a group of stations in a BPLN that can share certain functionality such as a common security protocol. An exemplary Core-Cell includes a Head End (HE), Repeaters (R), and Network Termination Units (NTUs), but may exclude Customer Premise Equipment (CPE). The Head End (HE) is a station that bridges a cell to the backhaul network. At a given time, a cell will have one active Head End and the Head End manages the cell including the Core-Cell and any associated Sub-Cells. A Repeater (RP) is a station that selectively retransmits MSDUs to extend the effective range and bandwidth of the BPLN Cell. Repeaters can also perform routing and QoS functions. The NTU is a station that connects a BPLN cell to the end users' network or stations. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single station may be designed to perform multiple functions. For example, a single station can simultaneously be programmed to perform the tasks associated with an RP and an NTU.

Various types of CPE stations (e.g., a computer) can be used as endpoint nodes in the network and such stations can communicate with other nodes in the network through the NTU, any number of repeaters, (e.g., including no repeaters), and the Head End. Each node in the network communicates as a communication "station" using a PHY layer protocol that is used by the nodes to send transmissions to any other stations that are close enough to successfully receive the transmissions. Stations that cannot directly communicate with each other use one or more repeater stations to communicate with each other. The stations have the potential to interfere with each other, but techniques can be used to coordinate in a centralized and/or distributed manner.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM) or Wavelet modulations can be used. Forward error correction (FEC) code line Viterbi codes, Reed-Solomon codes, concatenated code, turbo codes such as convolution turbo code, low density parity check code, etc., can be employed by the PHY to overcome errors.

One implementation of the PHY layers is to use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
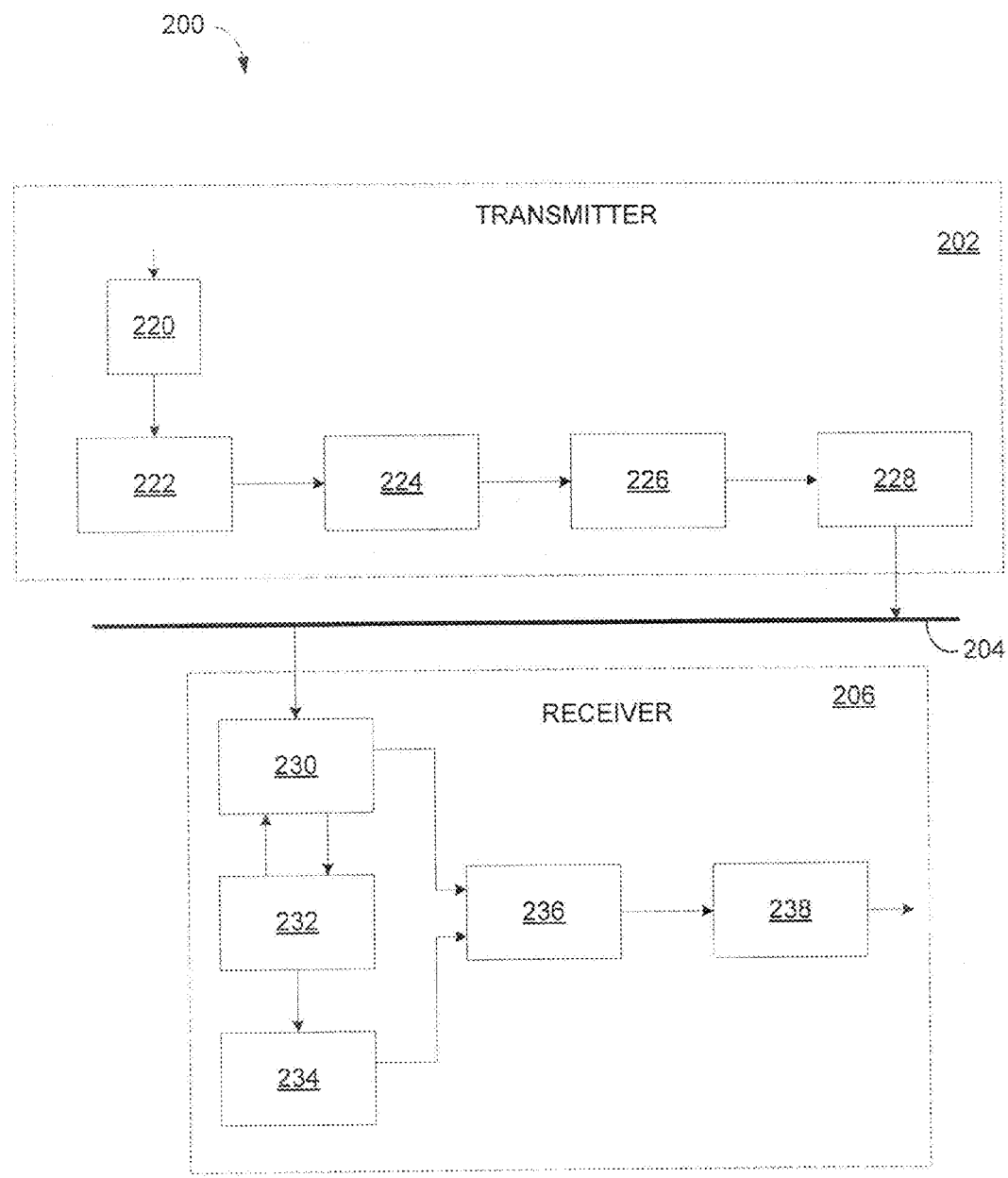
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one station to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$N\ S(n)=\Sigma A_i \exp[j(2\pi i n/N+\Phi_i)]\ i=1 \qquad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(T; t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Various stations in a network may generate regular beacon transmissions for various purposes. A beacon transmission (or simply a "beacon") includes management information that can be used for a variety of purposes. The stations may communicate with each other in time periods between beacon transmissions, provided the power line channel characteristics between any two communicating stations permit it.

In some networks one of the functions of a beacon transmission is to carry medium allocation (or scheduling) information. The scheduling information allocates some of the time between beacon transmissions as a contention period during which stations may contend for access to the power line medium. The scheduling information also allocates a contention free period during which times slots are assigned to particular stations for access to the power line medium. The scheduling information is provided relative to a TDMA scheduling period start time (or TDMA period start time).

The TDMA period start time is synchronized with respect to the AC line cycle of the power line waveform such that the time between consecutive TDMA period start times is based on the underlying AC line cycle frequency. Thus, to the extent that the AC line cycle frequency may vary, the TDMA period start time (and hence the duration of each TDMA period) may not be perfectly periodic. A station can "hear" a given station if the station can reliably receive transmissions from the given station. Since the beacons transmitted by the HE may not be heard by every station, each station transmits its own beacon to relay the information in the beacon to stations that do not hear the HE. While the stations may transmit their beacons at different times, the TDMA period start time is established with respect to the information contained in the beacons transmitted by the HE. At each station, the TDMA period start time can be synchronized to that of the HE using a start time synchronization procedure in which the stations relay the TDMA period start time to other stations in beacon transmissions. Each station can then predict a given TDMA period end time (or future TDMA period start time) based on the synchronized start time and the local AC line cycle at the given station by correlating the synchronized start time to a detectable feature of the power line waveform such as a zero crossing. The TDMA period can be set by the HE to any multiple of a half of the AC line cycle period, for example, by waiting for a given number of zero crossings.

In the absence of the AC line cycle such as on a DC power bus or on other medium such as coax or phone lines, the TDMA Period may be based on or synchronized to the Network Time Base (NTB). In this case, the HE would communicate the period and timing of the TDMA period to other stations in the network based on the NTB. The NTB is a network wide clock provided by the HE whose current clock value is included in the beacon (e.g., 32 bit NTB clock value based on a 25 MHz clock). Each station that can directly hear the HE will recover the NTB locally from the information communicated in the HE's beacon and will include the locally recovered NTB in their own beacon transmission for use by stations that cannot hear the HE directly. Stations that cannot hear the HE directly will recover the NTB from another station that it can directly hear that is nearer to the HE than itself and will also include the locally recovered NTB in their own beacon transmission. This provides a means for all stations in the network to recover the NTB. CPEs do not need to transmit the NTB in a beacon.

In some cases it is desirable to increase the TDMA period to make more efficient use of the medium by reducing the percentage of time devoted to sending the "overhead" information in the beacon transmission. There is also overhead information associated with transmissions from the stations during each TDMA period. It may also be desirable to keep the TDMA period small enough to provide a desired number of transmission opportunities in a given length of time to reduce the latency. Thus, the TDMA period can be selected according to a trade-off between keeping overhead low and latency between transmission opportunities low. For example, in some implementations the TDMA period is selected to be twice the AC line cycle period. In this case, when operating in power line environments with an AC line cycle frequency of 60 Hz, the TDMA period would be approximately 33.33 msec. When operating in power line environments with an AC line cycle frequency of 50 Hz, the TDMA period would be approximately 40 msec. Variations in the TDMA period may occur due to drift in the AC line cycle frequency. The HE determines the duration of the TDMA period as well as the start time of the TDMA period. In order to reduce latency, more than one time slot may be assigned to a station during a TDMA period.

Figure 3:
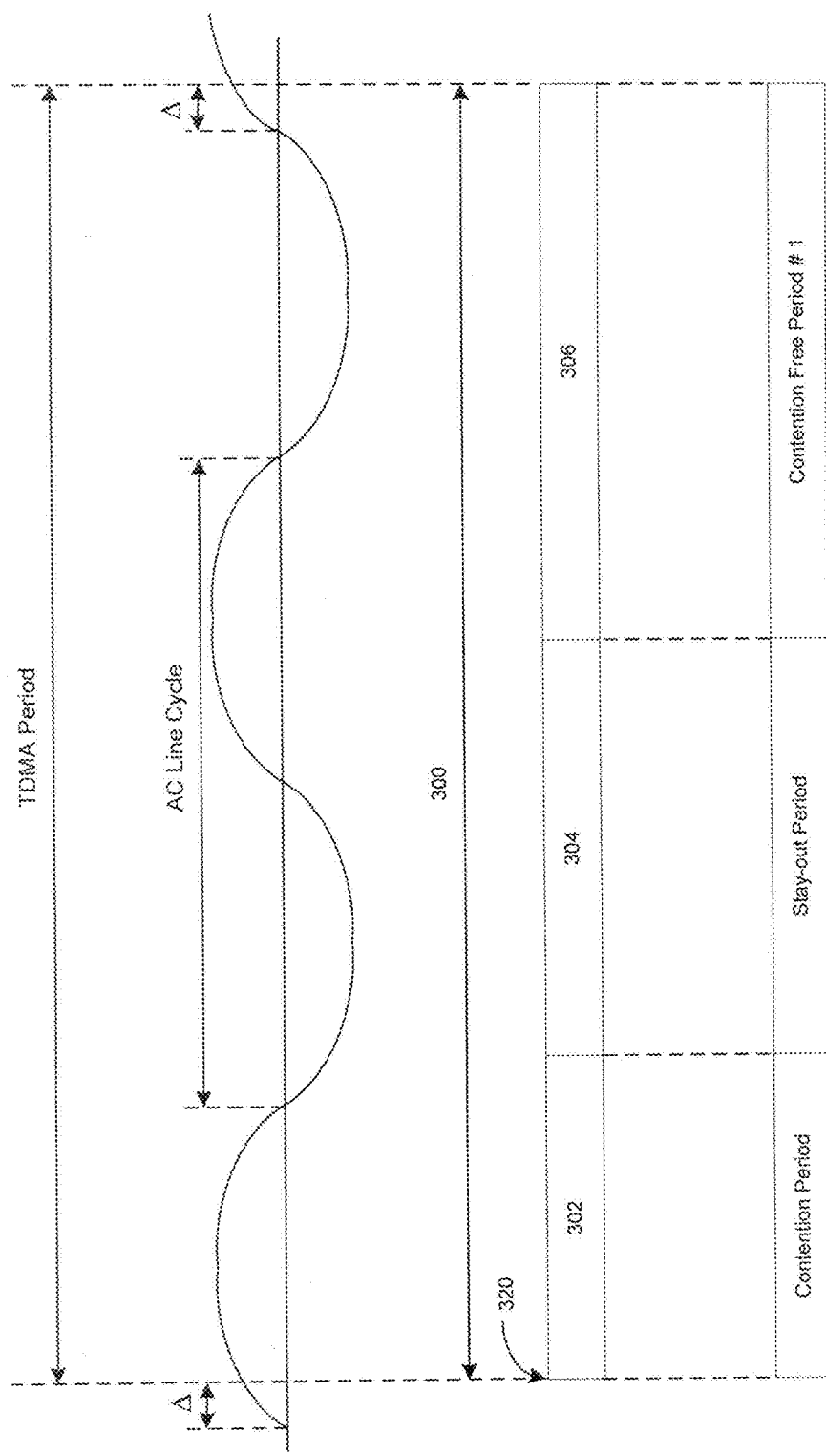
FIG. 3 is a timing diagram of a TDMA scheduling period.

FIG. 3 shows the structure of an exemplary TDMA period 300 which consists of a Contention Period 302 followed by a Stay-out Period 304 and a Contention Free Period 306. In general, a TDMA period can contain any number of Contention Periods, Stay-out Periods and Contention Free Periods in any order. The TDMA period may also be different for different stations in the BPLN. The Contention Period 302 is a time in which stations can contend for permission to transmit using a shared medium access protocol such as CSMA/CA. The Stay-out Period 304 is a time during which stations are not allowed to transmit. The Contention Free Period 306 includes time slots assigned for use by predetermined stations (e.g., using a Time Domain Multiple Access (TDMA) protocol). Beacons are typically transmitted during the Contention Period. Beacon may also be transmitted during Contention Free Periods. The frequency of beacon transmission depends on how frequently the associated management information needs to be communicated. Typically, beacons are transmitted once in several TDMA periods.

In networks in which repeaters are used to extend the reach of signals in the network, multiple stations can retransmit beacon transmissions to be heard by stations that would otherwise not be able to receive the beacon transmissions from the HE.

Stations in the network are synchronized with respect to the TDMA period based on their local AC line cycle tracking and TDMA Period Start Time information provided by the head end (HE). A TDMA allocation setup procedure is initiated by the HE station and is propagated through the repeater stations that are along a route for reaching a destination (e.g., a CPE station) to enable the stations on the route to cooperatively select TDMA allocations in a distributed manner. A "TDMA allocation" is an allocated time slot with in the Contention Free Period 306 of the TDMA period 300. A TDMA allocation can be used by a station for data that is to meet a certain QoS level or that requires a certain guaranteed bandwidth. In some cases, when a first station is allocated a time slot for transmitting to a second station, since TDMA allocations are generally assigned for transmissions in one direction, a time slot that is allocated to the second station for transmitting to the first station is used to send acknowledgements of previous transmissions from the first station. The route is formed over some number of links (or "hops") since data may need to be repeated over multiple repeater stations in order to reach a destination. In some cases, the route is associated with a "connection" between the HE station and a CPE station.

A connection represents a data flow (e.g., a set of related frames) between a higher layer entity (HLE) in a CPE station and a higher layer entity in the HE station. A connection can be either unidirectional or bidirectional. A unidirectional connection can represent either a downsteam or an upstream flow. A bidirectional connection represents a downstream and an upstream flow. Downstream flows carry traffic from the HE to a CPE. Upstream flows carry traffic from a CPE to the HE. The downstream and upstream flows may go through links among one or more repeaters and an NTU before reaching the intended destination. Setup of a connection can be initiated by the HLE of the HE or by a request from the CPE. If the connection request is accepted, the HE will initiate TDMA allocation setup procedure that causes the stations on the route between the HE and the CPE to reserve the necessary TDMA allocations for the connection. During the setup procedure, CSMA can be used during the Contention Period 302. After the TDMA allocations are set up, traffic belonging to the connection is sent using TDMA during the allocated TDMA time slots. If the HE rejects the connection request, the Contention Period 302 may be used to send the data belonging to the connection, or the data may be discarded.

A link between a given pair of stations can be categorized as connection-based links or connectionless links. For example, each link can map to a unique MAC Frame Stream, or queue, within the station. There can be more than one link between a given pair of stations. In some implementations, when multiple links are present between a given pair of stations, the traffic from the multiple links can be prioritized based on QoS requirements.

In some implementations, link identifiers (LIDs) can be used to identify traffic belonging to various links between a pair of stations. A MAC Frame header can contain a LID associated with the data unit that transmits the data between links. A priority link ID (PLID) can be used for connectionless traffic. The PLID can indicate the traffic class and/or channel access priority for priority resolution during contention. A connection link ID (CLID) can be used for connection-based traffic. The connection-based links can be established as part of the TDMA allocation setup procedure.

Figure 4:
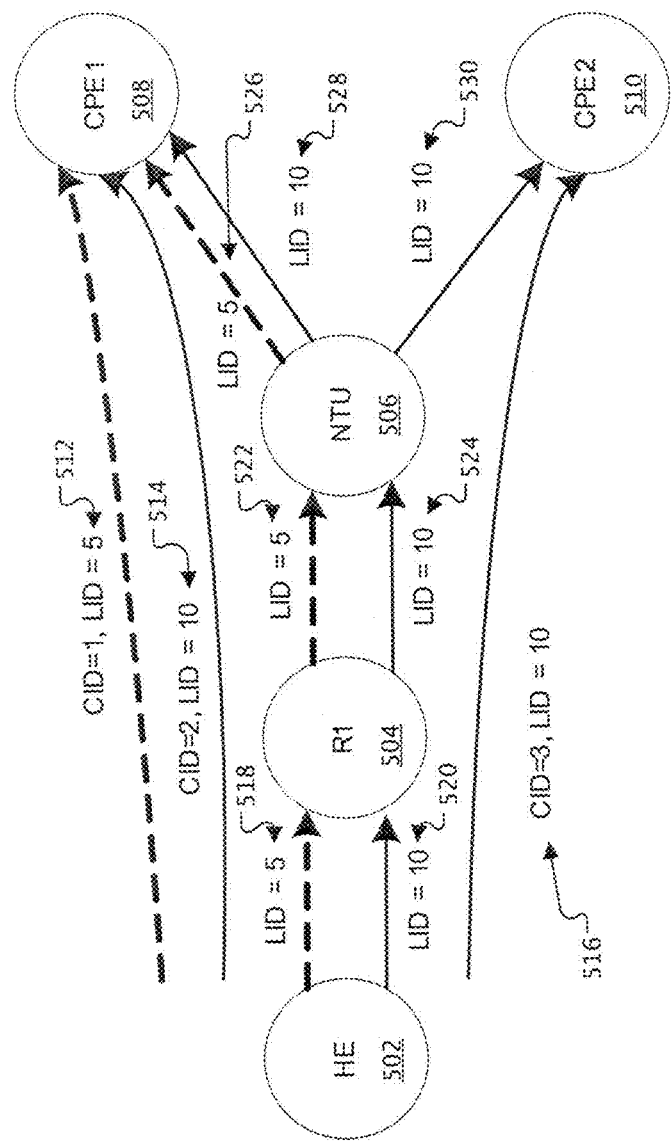
FIG. 4 is a block diagram of network communications.

FIG. 4 is a block diagram of exemplary network communications for an exemplary access network of FIG. 1. FIG. 4 illustrates five stations in an exemplary access network: a head end, HE 502, a repeater, R1 504, a network termination unit, NTU 506, a first customer premise equipment, CPE1 508, and a second customer premise equipment CPE2, 510. Additionally, FIG. 4 illustrates three unidirectional downstream connections in the network with connection identifiers (CIDs) of 1, 2, and 3. LIDs can also be associated with connections, as described in more detail below. For example, the first connection 512 is between HE 502 and CPE1 508 and has a LID of 5. The second connection 514 is between HE 502 and CPE1 508 and has a LID of 10. The third connection 516 is between HE 502 and CPE2 510 and has a LID of 10.

In one implementation, if a station has traffic, e.g., data, with different LIDs that is intended for the same destination, e.g., the next station, or hop, the traffic can be transmitted as separate data units. In another implementation, if a station has traffic, e.g., data, with the same LIDs that is intended for the same destination, e.g., the next station, or hop, the traffic can be transmitted in a single data unit, or a single burst of data units.

In FIG. 4, there are two links, LID=5 518 and LID=10 520, between HE 502 and R1 504. According to the implementations described herein, at the HE 502 it can be determined that the traffic with the same LID and with the same next hop destination can be aggregated and transmitted together in a data unit from HE 502 to R1 504, while traffic that has different LIDs and different next hop destinations can be transmitted in separate units from HE 502 to R1 504. For example, at the HE 502, traffic from the second connection 514 and the third connection 516 can be aggregated into a single link, e.g., LID=10 520, because the second connection 514 and the third connection 516 share the same LID and have the same next hop destination. Furthermore, the traffic from the First connection 512 can be included in a separate link, e.g., LID=5 518, because it does not share the same LID with the second connection 514 and the third connection 516.

After the next station receives the aggregated and/or separate data via the links, the next station determines how the data can be aggregated and/or separated to be transmitted to the next station. For example, in the illustration of FIG. 4, two links of data, LID=5 518 and LID=10 520, can be received at R1 504 from HE 502. At R1, it can be determined that the traffic with the same LID and with the same next hop destination can be aggregated and transmitted together in a data unit from R1 504 to NTU 506, while traffic that has different LIDs and different next hop destinations can be transmitted in separate units from R1 504 to NTU 506.

For example, at R1 504, there are two links, LID=5 522 and LID=10 524, represented between R1 504 and NTU 506. Therefore, at R1 504, traffic from the second connection 514 and the third connection 516 can be aggregated into a single link, e.g., LID=10 524, because the second connection 514 and the third connection 516 share the same LID and the are being transmitted to the same next hop destination, NTU 506. Furthermore, the traffic from the first connection 512 can be included in a separate link, e.g., LID=5 522, because it does not share the same LID with the second connection 514 and the third connection 516.

At the NTU 506, traffic can be received via two links, LID=5 522 and LID=10 524, from R1 504. The NTU 506 can determine how to transmit the traffic downstream to CPE1 508 and CPE2 510. As discussed herein, the NTU 506 can determine that traffic with the same LID and with the same next hop destination can be aggregated and transmitted together in a data unit from NTU 506 to CPE1 508 or CPE2 510, while traffic that has different LIDs and different next hop destinations can be transmitted in separate units from NTU 506 to CPE1 508 or CPE2 510.

For example, at the NTU 506, the first connection 512 has a LID=5 and needs to be transmitted to CPE1 508; the second connection 514 has a LID=10 and needs to be transmitted to CPE1 508; and the third connection 516 has a LID=10 and needs to be transmitted to CPE2 510. Therefore, at NTU 506, none of the three connections share the same LID and the same next hop destination, and the traffic can be transmitted via separate links to the respective CPE. For example, as illustrated in FIG. 4, the traffic from the first connection 512 can be included in a separate link, e.g., LID=5 526, from NTU 506 to CPE 1508; the traffic from the second connection 514 can be included in a separate link, e.g., LID=10 528, from NTU 506 to CPE1 508; and the traffic from the third connection 516 can be included in a separate link, e.g., LID=10 530, from NTU 506 to CPE2 510.

In the TDMA allocation setup procedure, the HE station can centrally determine TDMA allocations for stations that are near the HE (e.g., within some number of hops), and the remaining stations can collectively determine, in a distributed way, the TDMA allocations for each hop individually. Thus, traffic near the HE can be optimized by the HE to reduce potential congestion, which tends to be higher near the HE since traffic from many end CPE stations may converge at repeater stations just below the HE and traffic from the backhaul network is distributed from the HE. A given time slot can be reused by stations that are separated, such that they cannot hear (or interfere with) each other. Route changes and changes in traffic and/or channel characteristics can affect the TDMA allocations, and these changes can be communicated to other stations using beacon transmissions. TDMA Schedule information is transmitted in beacons and includes information on TDMA allocations currently used by the station transmitting the TDMA Schedule and its immediate neighbors (if known). Each station compiles TDMA Schedule information received from its neighbors to schedule transmissions to/from its neighbors accordingly. Exemplary TDMA Schedule information is described in more detail below.

Figure 5A:
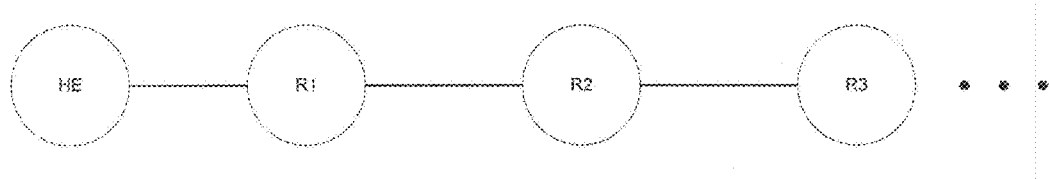
FIG. 5A is a diagram of a network topology among stations.
Figure 5B:
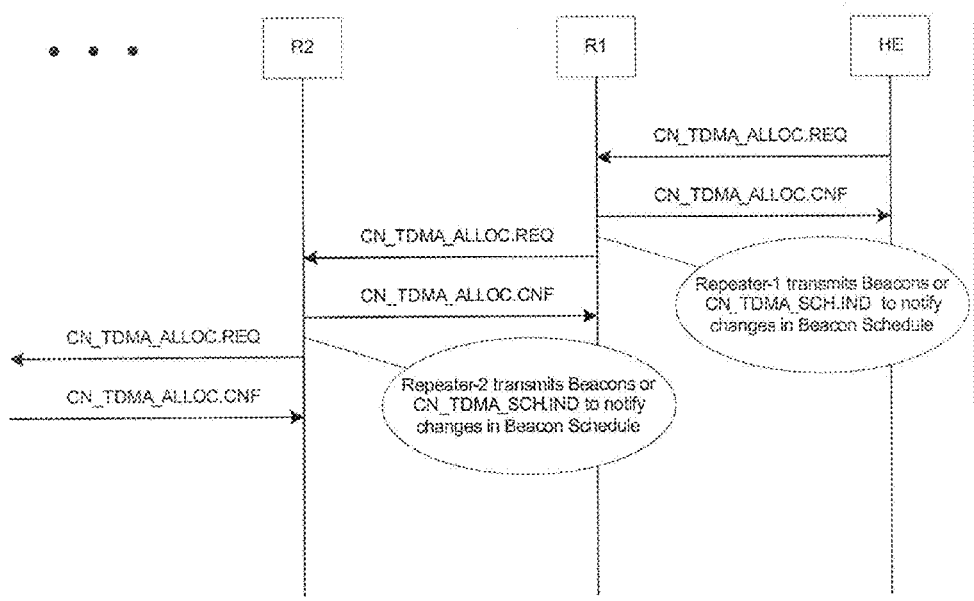
FIG. 5B is a timing diagram of TDMA allocation setup procedure.

Referring to FIGS. 5A and 5B, an exemplary TDMA allocation setup procedure is described for selecting time slots to be used for a connection that is being set up from an HE in communication with a repeater station R1, which is in communication with a repeater station R2 station, which is in communication with other stations over some number of hops to a destination CPE. The network topology for the connection of this example is shown in FIG. 5A. Note that other stations not on the route of the connection are not shown, but may exist and may have an effect on the allocations if transmissions to or from these other stations may interfere, as described in more detail below. In this example, stations that can hear each other are connected by solid lines. Thus, station R1 can hear both the HE and station R2. Station R2 can hear both station R1 and station R3, and so on.

Referring to FIG. 5B, the HE initiates the TDMA allocation setup procedure by transmitting an allocation message CN_TDMA_ALLOC.REQ to the station R1. The allocation message provides the TDMA allocations during which HE transmits to and/or receives from station R1. The allocation message may also optionally include TDMA allocations during which repeater R1 transmits to and/or receives from repeater R2. This option can be used by the HE to optimize network utilization near the HE (which is typically the most congested part of the network). The allocation message also includes information that identifies the newly established connection.

The HE then starts transmitting beacon transmissions to indicate the new TDMA allocations to its neighbors. Beacons triggered by TDMA allocation changes can be transmitted multiple times following the TDMA allocation changes to ensure that all stations that can hear the HE are updated with the new TDMA allocations.

Repeater R1 receives the allocation message CN_TDMA_ALLOC.REQ from the HE. Reception of CN_TDMA_ALLOC.REQ causes repeater R1 to respond with a CN_TDMA_ALLOC.CNF confirming reception. If the received allocation message does not include TDMA allocations for transmits to and/or receives from repeater R2, repeater R1 will determine the TDMA allocations (by transmitting its own allocation message) for transmits to and/or receives from repeater R2. Repeater R2 starts transmitting beacon transmissions to indicate the new TDMA allocations to its neighbors.

This process of sending CN_TDMA_ALLOC.REQ allocation messages and responding with CN_TDMA_ALLOC.CNF confirmation messages continues until the destination station is reached. If an intermediate repeater cannot provide TDMA allocation(s) for the connection, it will indicate so in the allocation message that it sends to the next repeater. Further, it notifies the HE about the lack of TDMA allocations. Traffic belonging to this connection will be transmitted along with other associated traffic (if any) and intended for the same next hop destination using CSMA. CSMA channel access can be used for any traffic that cannot fit in the TDMA allocations (if any).

After the TDMA allocations are set up, each transmitter is responsible for ensuring that it has sufficient TDMA allocations for transmitting connection-based traffic associated with the connection that has been set up. If the TDMA allocation has to be increased at a given station (for example due to reduction in PHY data rates) and if there is sufficient bandwidth available (based on schedule information available from neighboring stations), the station will update its TDMA Schedule information and convey the information to its neighbors in its beacon transmissions. The HE is able to modify the TDMA allocations that were previously established by the HE for stations near it (i.e., a few hops from it). If a conflict in the TDMA allocation was found, the conflict can be resolved by taking into account characteristics such as proximity to the HE, giving stations closer to the HE preference, or the priority level, giving preference to allocations of higher priority. The station that looses the conflict resolution procedure will try to obtain a different TDMA allocation. If there is insufficient bandwidth for a new TDMA allocation, the station may send an error message to the HE.

Figure 6:
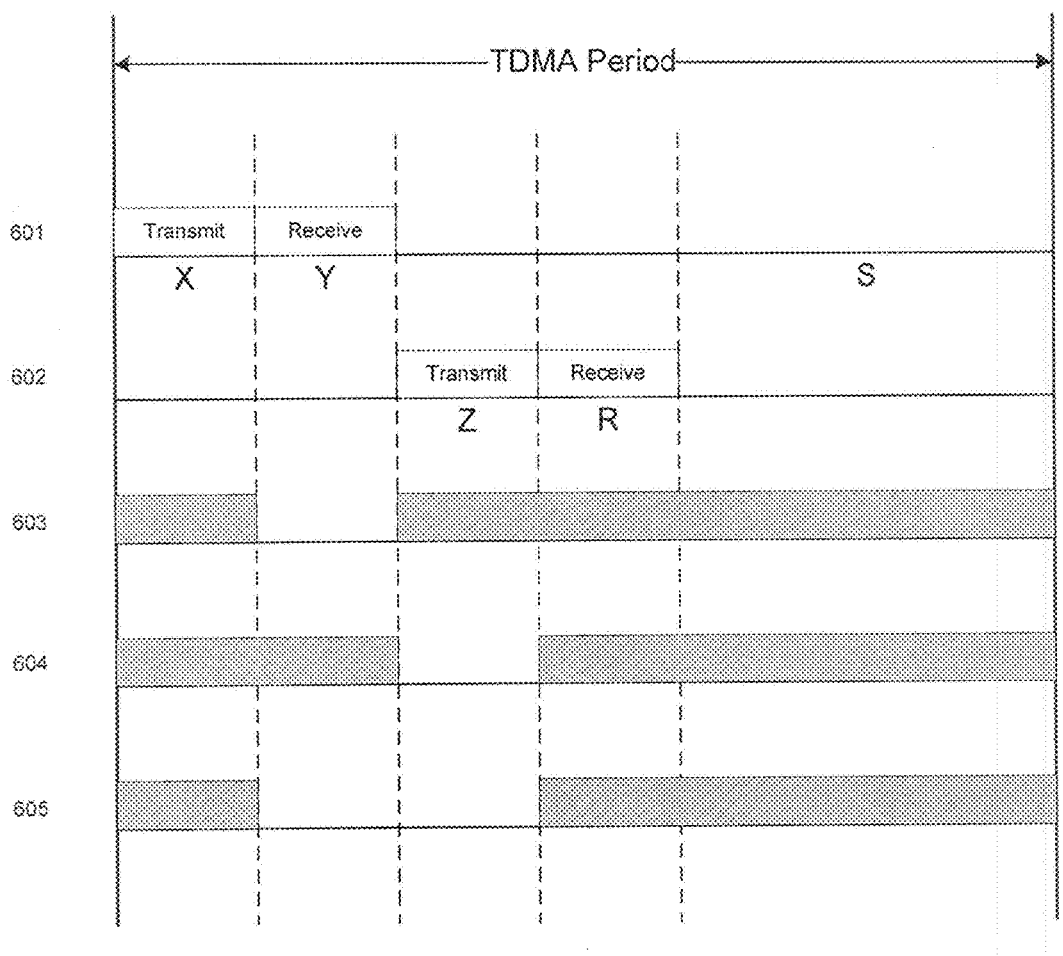
FIGS. 6 and 7 are diagrams illustrating selection of TDMA allocations

The stations use rules for determining which time slots to select when setting up TDMA allocations. These rules depend on whether various conditions are satisfied with respect to the TDMA allocations already in use. FIG. 6 illustrates a TDMA period in which TDMA allocations in time slots X, Y, Z, R are already in use by the HE and station R3 (e.g., for transmitting and receiving data from some other connection). The existing allocations 601 show that the HE is transmitting in time slot X and receiving in time slot Y. The existing allocations 602 show that station R3 is transmitting in time slot Z and receiving in time slot R.

Given these existing TDMA allocations, for station R1 to schedule a transmission to station R2, two conditions have to be satisfied.

Condition 1: station R1's transmission should not interfere with any ongoing receptions at stations that can hear station R1. Thus, no station that station can hear R1 should be receiving. Otherwise, station R1's transmission will interfere with that receiver. (In some implementations, station R1 can determine which station can hear R1 by determining which stations R1 can hear.) Note that station R1 can transmit even if another station that it can hear is using that time to transmit. Since station R1 cannot hear the intended receiver, it is very unlikely that the intended receiver will hear station R1's transmissions.

Condition 2: station R1's signal at station R2 will not be impaired by transmissions from stations that can be heard by station R2. Thus, no station that station R2 can hear (other than station R1) should be transmitting. Otherwise, that transmitter's signal will interfere with station R1's signal. Note that station R2 can receive even if another station that it can hear is using that time to receive. Since station R2 cannot hear the transmitter, it is very unlikely that the transmitter's signal will interfere with its reception.

Failing successful scheduling of a TDMA allocation, stations can also schedule transmission during the Contention Period 302. The TDMA allocations may be chosen if necessary (e.g., if no other time is available) that interfere with existing allocations used by R3 since those allocations are further from the HE and thus R3 must give preference to allocations belonging R2 and R1.

Referring again to FIG. 6, station R1 can transmit to station R2 during intervals 603 including time slots X, Z, R, and S (where no station is using TDMA allocations). Similarly, intervals 604 show time slots during which station 1 can receive transmissions from station R2 including time slots X, Y, R, and S. Using the overlap between the intervals 603 and 604, station R1 determines that it can transmit to station R2 during the interval 605, which includes any of time slots X, R and S.

Figure 7:
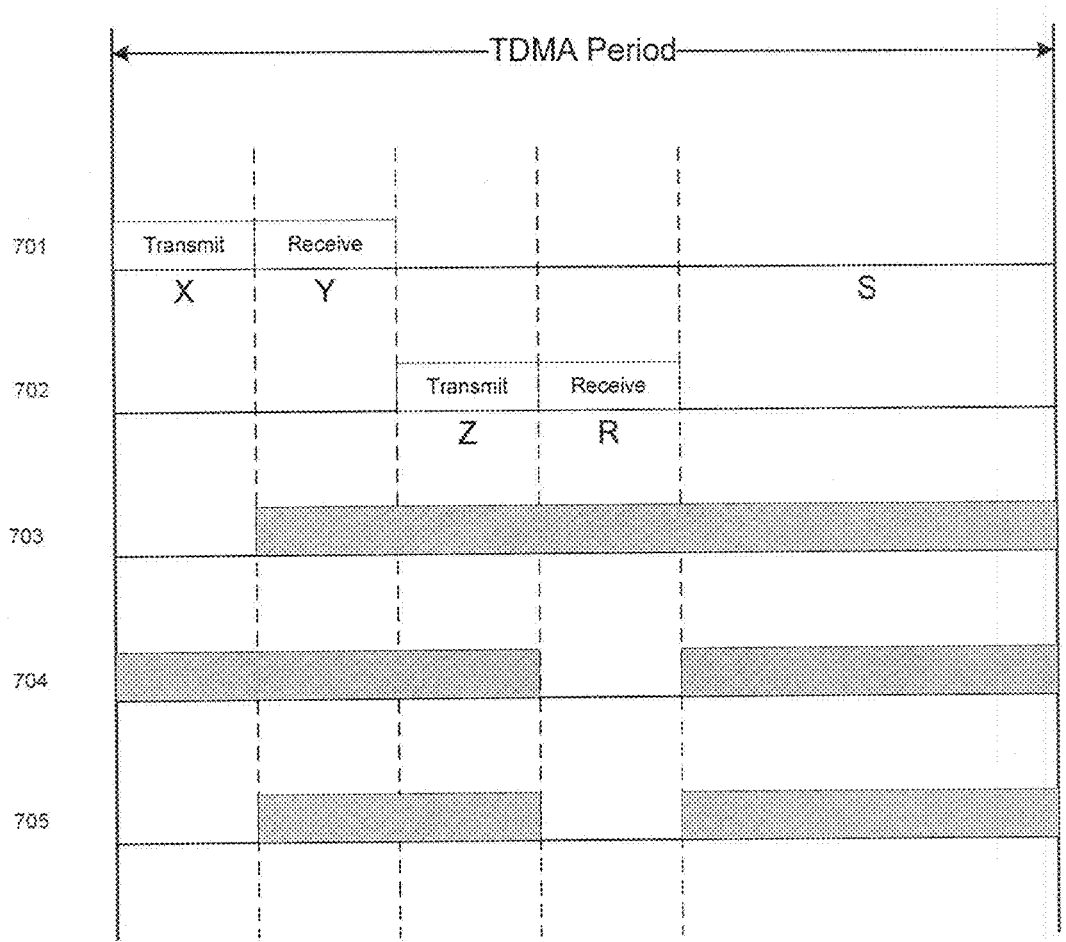

FIG. 7 illustrates scheduling of transmissions from station R2 to station R1, by station R1. The existing allocations 701 show that the HE is transmitting in time slot X and receiving in time slot Y. The existing allocations 702 show that station R3 is transmitting in time slot Z and receiving in time slot R. Station R1 can receive from station R2 during intervals 703 including time slots Y, Z, R, and S. Similarly, intervals 704 show time slots during which station R2 can transmit to station R1 including time slots X, Y, Z, and S. Using the overlap between the intervals 703 and 704, station R1 determines that station R2 can transmit to station R1 during the interval 705, which includes any of time slots Y, Z and S.

While the above example illustrates the basic behavior, enhancements can be made if additional information is present. The above two conditions can be relaxed as follows.

Condition 1: It is possible for station R1 to transmit during Y in some cases even if station HE is receiving. For example, if a station from which the HE is receiving is much closer to the HE than station R1, then station R1's transmission should not effect the reception at the HE. In particular, if the HE provided information on the signal strength of its received signal then station R1 can use it to determine if can transmit or not during Y. Another option is for station R1 is to reduce it's transmit signal strength (or signal power) so that it does not interfere with the HE's reception.

Condition 2: It is possible that station R3 can receive during Z in some cases even if station R3 is transmitting. For example, if station R3 is much further away from station R2 than station R1, the interference from station R3 would be minimal, thus enabling it to receive from station 1. In particular, if station R2 provided information on the signal strength of received signal from station R3, station R1 can use it to determine if it can transmit to station R2 or not during Z.

Similar enhancements can be made for scheduling transmissions from station R2 to station R1, by station R1.

Figure 8:
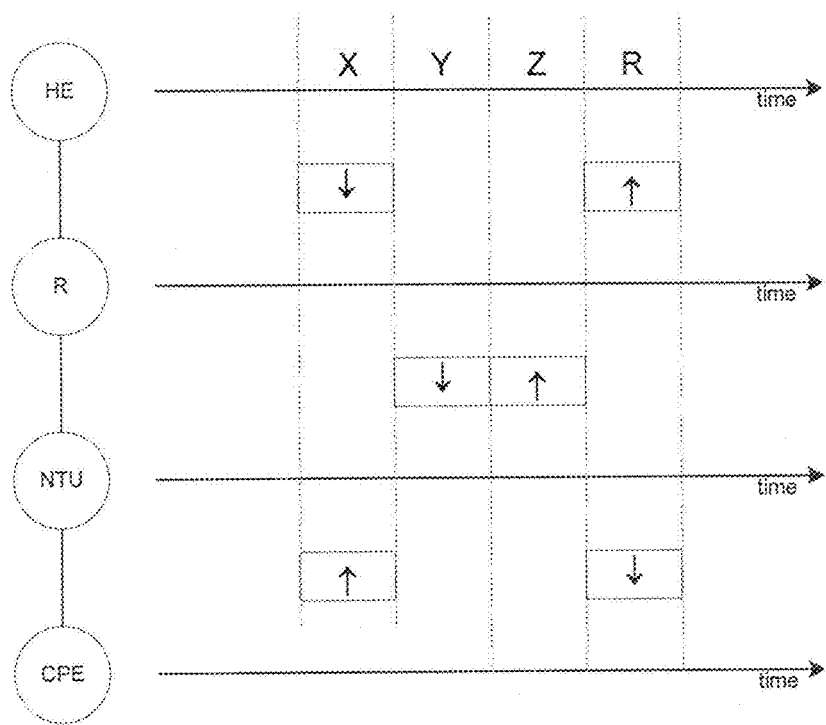
FIG. 8 is a timing diagram of TDMA allocations. .

FIG. 8 shows an exemplary schedule of TDMA allocations for a bi-directional connection over a path from an HE, a repeater R, an NTU, and a CPE. In this example, the TDMA allocations provide 3-hop transfer (over the 3 links HR-R, R-NTU, and NTU-CPE) in both upstream and downstream directions within 4 consecutive time slots X, Y, Z, and R of a single TDMA period. The stations can be configured to select the TDMA allocations such that this type of "X-shaped" pattern exists when there are at least as many time slots available as there are links on the route for the connection. For example, the HE selects time slot X for transmitting from HE to R and time slot R for transmitting from R to HE. Station R selects time slot T for transmitting from R to NTU and time slot Z for transmitting from NTU to R. Station NTU selects time slot X for transmitting from NTU to CPE and time slot R for transmitting from CPE to NTU. The time slots can be reused in this manner when the conditions described above are satisfied with respect to any ongoing transmissions. By scheduling the TDMA allocations in this manner such that successive transmissions over links of a route are scheduled in respective sequential time slots, the latency of the corresponding connection is reduced.

TDMA Schedules transmitted by various stations contain the necessary information for choosing TDMA time slots and CSMA allocations for transmitting to and receiving from neighboring stations (i.e., stations that can be directly heard). The following is an example of information that can be included in the TDMA Schedule information. In this example, TDMA Schedule information includes three parts:

1. TDMA Transmit Allocation information,
2. TDMA Receive Allocation information, and
3. CSMA Allocations.

TDMA Transmit Allocation information provides various intervals in the TDMA Period where (i) the station is actively transmitting and (ii) the station can possibly transmit, as follows.

i. In this case, the TDMA Transmit Allocation information includes:
     a. priority of the TDMA allocation,
     b. transmit power being used, and
     c. identity of the receiver.
   ii. In this case, the station can hear an active TDMA receiver from a neighboring station during this interval. The TDMA Transmit Allocation information in this case includes:
     a. priority of the TDMA allocation being heard,
     b. transmit power at which the station can transmit without interfering with the ongoing transmissions, and
     c. identity of the TDMA receiver.

This information enables other stations to schedule transmissions from the current station if the transmit power level constraints are acceptable.

TDMA Receive Allocation information provides various intervals in the TDMA Period where (i) the station is actively receiving and (ii) the station can possibly receive, as follows:

i. In this case, the TDMA Receive Allocation information includes:
     a. priority of the TDMA allocation,
     b. signal power at the receiver, and
     c. identity of the transmitter.

This information enables stations that can hear this station to schedule TDMA allocation such that they do not interfere with it.

ii. In this case, the station can hear a TDMA Transmitter that is actively using this interval. The TDMA Receive Allocation information in this case includes, a. priority of the TDMA allocation being heard,
b. signal power at the receiver, and
c. identity of the transmitter.

This information enables stations to schedule transmissions from this station such that they do not interfere with the on going transmission.

If a station is using a TDMA allocation for both transmitting and receiving, its TDMA Schedule information will contain a corresponding entry in both TDMA Transmit Allocation and TDMA Receive Allocation.

The TDMA Schedule information is structured so that a station can schedule TDMA transmission to/from stations that it can directly hear. For example, to schedule an allocation for transmitting to a specific station, the station has to determine allocations where in can transmit (i.e., intervals where it can possibly transmit or CSMA allocations) and find intervals where it receiver can receive (i.e., intervals where receiver can possibly receive or the receiver's CSMA allocations). The priority information can be used to determine if the station can preempt an existing TDMA allocation. This enables a link closer to the HE station to be allocated in a manner that increases efficiency by preempting lower priority TDMA allocations. When a station determines that its TDMA allocation has been preempted, it stops using that TDMA allocation and finds a different TDMA allocation.

CSMA Receive allocation information provides the various intervals of time where the station can transmit using CSMA channel access mechanism.

Many other implementations of the invention other than those described above are within the invention, which is defined by the following claims.

What is claimed is:

1. In a network in which some data are transmitted between stations during time slots in contention free periods, a method for selecting the time slots, the method comprising:
   collecting timing information at at least one of the stations in the network, the timing information indicating the times of existing time slots used by stations for inter-beacon transmissions that can be reliably received by the at least one station collecting the timing information; and
   distributing the timing information to other stations in the network including a first station;
   wherein a new time slot for inter-beacon transmission between the first and a second station is selectable based at least on the distributed timing information and timing information indicating the times of existing time slots used by stations whose inter-beacon transmissions can be reliably received by the first station.

2. The method of claim 1, further comprising collecting additional information about inter-beacon transmissions made during the existing time slots by the stations whose inter-beacon transmissions can be reliably received, the additional information being useful in selecting the new time slot and including at least one of information on transmit power level, information on received signal strength, and information on priority.

3. The method of claim 2, wherein the new time slot is selected to overlap in time with at least one existing time slot, and wherein processing of the additional information establishes that overlapping of the new time slot with the existing time slot can be accomplished because the transmit power level used by the station transmitting during the existing time slot is less than that used by the first or second station for transmission during the new time slot, wherein the overlapping new time slot and the at least one existing time slot allow for respective overlapping inter-beacon transmissions.

4. The method of claim 2, wherein the new time slot is selected to overlap in time with at least one existing time slot, and wherein processing of the additional information establishes that overlapping of the new time slot with the existing time slot can be accomplished because a transmit power level to be used for transmissions during the new time slot will not interfere with existing transmissions in the existing time slot, wherein the overlapping new time slot and the at least one existing time slot allow for respective overlapping inter-beacon transmissions.

5. The method of claim 2, wherein the new time slot is selected to overlap in time with at least one existing time slot, and wherein processing of the additional information establishes that overlapping of the new time slot with the existing time slot can be accomplished because of the received signal strength of transmissions in the existing time slot being less than a received signal strength of the transmissions in the new time slot, wherein the overlapping new time slot and the at least one existing time slot allow for respective overlapping inter-beacon transmissions.

6. The method of claim 2, wherein beacons contain the timing and additional information on existing time slots.

7. The method of claim 2, wherein the timing and additional information on existing time slots is transmitted to other stations in the inter-beacon transmissions.

8. The method of claim 2, wherein the information on priority comprises information on the priority of transmissions during the existing time slot.

9. The method of claim 8, wherein the new time slot is selected to overlap at least one existing time slot in which the priority of transmissions is lower than the priority of transmissions to occur during the new time slot.

10. The method of claim 9, wherein the network is a point to multi-point network and priority is based on the number of hops that inter-beacon transmission traffic belonging to the existing and new time slots is from a head end.

11. The method of claim 8, wherein the network is a point to multi-point network and priority is based on the number of hops that inter-beacon transmission traffic belonging to the existing and new time slots is from a head end.

12. The method of claim 1, wherein selecting the new time slot is also based at least on information indicating the times of existing time slots during which stations heard by the first station are receiving.

13. The method of claim 12, wherein the new time slot excludes times when stations heard by the first station are scheduled to receive other transmissions.

14. The method of claim 13, wherein the new time slot is selected at the first station for transmission from the first station to the second station.

15. The method of claim 1, wherein selecting the new time slot is also based at least on information indicating the times of existing time slots during which stations scheduled to transmit can be heard by the second station.

16. The method of claim 15, wherein the new time slot excludes times when stations heard by the second station are scheduled to transmit other transmissions.

17. The method of claim 1, wherein selecting the new time slot is also based at least on information indicating the times of existing time slots during which stations heard by first station are transmitting.

18. The method of claim 17, wherein the new time slot excludes times when stations heard by the first station are scheduled to transmit other transmissions.

19. The method of claim 18, wherein the new time slot is selected at the first station for transmission from the second station to the first station.

20. The method of claim 1, wherein selecting the new time slot is also based at least on information indicating the times of existing time slots during which stations scheduled to receive can be heard by the second station.

21. The method of claim 20, wherein the new time slot excludes times when stations heard by the second station are scheduled to receive other transmissions.

22. The method of claim 21, wherein the new time slot is selected at the first station for transmission from the second station to the first station.

23. The method of claim 1, wherein the new time slot is selected to overlap in time with at least one existing time slot, wherein the overlapping new time slot and the at least one existing time slot allow for respective overlapping inter-beacon transmissions.

24. The method of claim 1, wherein the timing information on existing time slots comprises the source and/or destination address of transmissions in the existing period.

25. The method of claim 1, wherein the network comprises a plurality of neighboring home networks, and the existing time slot is used in one neighboring home network and the new time slot is selected for use in a different neighboring home network.

26. The method of claim 1, wherein the stations in the network are configured as peers.

27. The method of claim 1, wherein the stations in the network are configured to use a point to multipoint network protocol.

28. The method of claim 1, wherein at least one of the stations is a head end station and the selection of time slots is initiated after the head end station has agreed to establish a network connection with another station in the network.

29. The method of claim 28, wherein the first station is the head end station, and the second station is a station that can be heard by the head end station.

30. The method of claim 28, wherein selecting a time slot for transmission between the second station and a third station is performed after the time slot has been chosen for transmission from the first to the second station.

31. The method of claim 1, wherein beacons contain the timing information on existing time slots.

32. The method of claim 1, wherein the timing information on existing time slots is transmitted to other stations in the inter-beacon transmissions.

33. The method of claim 1, wherein the timing information provided by a station includes at least some time periods that the station is using for contention periods.

34. The method of claim 1, wherein at least a portion of the new time slot selected comprises time intervals currently used for CSMA communication by at least the first and second stations.

35. The method of claim 1, wherein the first station is a head end of a point to multi-point network, and wherein the new time slots for multiple hops downstream from the head end are selectable by the head end, including a hop from the head end to the second station, and from the second station to a third station.

36. The method of claim 1, wherein each station in the network can reliably receive transmissions from all other stations in the network.

37. The method of claim 1, wherein at least some stations in the network cannot reliably receive transmissions from all other stations in the network.

38. The method of claim 1, wherein transmissions in the existing time slot cannot be reliably received by only one of the first and second stations.

39. The method of claim 1, wherein a first time slot is allocated for transmission from the first station to the second station and a second time slot is allocated for transmission from the second station to the first station, and the second time slot is used to send acknowledgements of previous transmissions from the first station during the first time slot.

40. The method of claim 1, wherein the network is a powerline network.

41. A method for communicating among stations in a network, the method comprising:

providing repeated beacon transmissions from a first station for coordinating inter-beacon transmissions among a plurality of the stations, wherein the repeated beacon transmissions include information regarding allocated time for the first station to transmit or receive inter-beacon transmissions, wherein at least some information received at a second station is capable of retransmission by the second station to a third station, including at least a portion of a received beacon transmission from the first station; and wherein information regarding allocated time for the third station to transmit or receive transmissions is based on available time slots in the retransmitted information by the second station to the third station and is capable of being transmitted by the third station, wherein the third station is configured to reliably receive transmissions from the second station but not the first station;

wherein inter-beacon transmissions from stations in the network are hierarchically determined in time based on proximity to the first station.

42. The method of claim 41, wherein information regarding allocated time for the second station to transmit or receive inter-beacon transmissions is transmittable by the second station.

43. The method of claim 41, wherein the information regarding allocated time for the first station to transmit or receive transmissions is also usable to determine allocated time for the second station to transmit or receive transmissions.

44. The method of claim 41, wherein determining allocated time for a station to transmit or receive transmissions includes determining the allocated time relative to a periodic time reference indicated in a beacon transmission.

45. The method of claim 41, wherein the second station is capable of reliably receiving transmissions from the first station.

46. The method of claim 41, wherein the first station is in communication with a fourth station over a route that includes the second station and the third station.

47. The method of claim 41, conflicts between time allocations by different stations are resolved based on proximity of the different stations to the first station.

48. The method of claim 47, wherein the proximity of a given station to the first station comprises a number of hops along a route from the first station to the given station.

49. The method of claim 47, wherein the proximity of a given station to the first station comprises a signal strength of a transmission from the first station received by the given station.

50. The method of claim 47, wherein the proximity of a given station to the first station comprises a data rate of a transmission from the first station received by the given station.

51. A method for communicating among stations in a powerline network, the method comprising:
- from a first station in the powerline network, transmitting information characterizing transmissions received by the first station from other stations; and
- at the first station in the powerline network, determining allocated time for the station to transmit or receive transmissions based on at least some of the information characterizing transmissions, and transmitting information indicating the allocated time;
- wherein each of multiple other stations in the powerline network are capable of determining allocated time for the respective station to transmit or receive transmissions based on at least some of the information characterizing transmissions and based on at least some of the information indicating the allocated time from the first station,
- wherein each station in the powerline network is separated from the first station by a number of hops over which transmissions are repeated, and wherein the first station determines allocated time for a first set of stations to transmit or receive transmissions over multiple hops, and remaining stations are configured to collectively determine allocated times to transmit or receive transmissions over individual hops.

52. The method of claim 51, wherein the information characterizing transmissions received by the first station from other stations includes at least one of: times at which the transmissions were received, and signal strengths of the transmissions.

53. The method of claim 51, wherein at least some of the multiple other stations are capable of forwarding the information characterizing transmissions.

54. The method of claim 53, wherein each of the other multiple stations in the powerline network is capable of determining their respective allocated time based on at least some of the forwarded information.

55. A system for communicating among multiple stations, comprising:
- a first station configured to provide repeated beacon transmissions for coordinating inter-beacon transmissions among a plurality of the stations, wherein the repeated beacon transmissions include information regarding allocated time for the first station to transmit or receive inter-beacon transmissions;
- wherein at least some information received at a second station is retransmittable by the second station to a third station, including at least a portion of a received beacon transmission; and
- wherein information regarding allocated time for the third station to transmit or receive transmissions is based on available time slots in the retransmitted information by the second station to the third station and is capable of being transmitted by the third station, wherein the third station is capable of reliably receiving transmissions from the second station but not from the first station;
- wherein inter-beacon transmissions from stations in the network are hierarchically determined based on proximity to the first station.

* * * * *